May 27, 1969          A. A. LUSKOW          3,447,083
ELECTRICAL POWER METERING DEVICE FOR INSERTION
              IN A TRANSMISSION LINE
              Filed Dec. 1, 1966

INVENTOR
Alfred Allan Luskow
BY
Baldwin Wight Niller & Brown
ATTORNEYS

United States Patent Office 3,447,083
Patented May 27, 1969

3,447,083
ELECTRICAL POWER METERING DEVICE FOR INSERTION IN A TRANSMISSION LINE
Alfred Allan Luskow, St. Albans, England, assignor to Marconi Instruments Limited, London, England, a British company
Continuation-in-part of application Ser. No. 402,145, Oct. 7, 1964. This application Dec. 1, 1966, Ser. No. 598,301
Int. Cl. G01r 23/04, 25/02, 27/02
U.S. Cl. 324—106                                7 Claims

ABSTRACT OF THE DISCLOSURE

This invention relates to metering devices for monitoring or metering electrical power in the frequency range from 0 c./s. up to a frequency in the order of 1000 mc./s.

Figure 1:
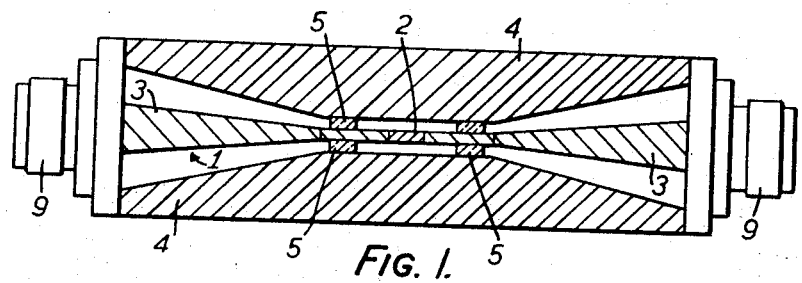

The disclosure relates to power metering devices in which the power to be metered is supplied to a thermal converter such as thermo-couple or thermistor which produces an E.M.F. when heated and which will accordingly produce an E.M.F. representative of said power. The power metering device is in the form of a balanced slab or strip transmission line having a central thin-walled tubular conductor with the thermal converter placed close to the tubular conductor in heat transfer relation thereto. The connection leads from the thermal converter are passed between adjacent conductors on the strip transmission line to the exterior of the transmission line and lie in the median plane of the transmission line.

The thin-walled tubular conductor is disclosed as being in the form of a deposit upon an insulating carrier core which may be an insulating rod or an insulating tube and may be of skeleton form.

---

This is a continuation-in-part of application Ser. No. 402,145, filed Oct. 7, 1964.

The principal object of the present invention is to provide improved and simple electrical power meters of aforementioned kind which shall be of wide frequency band operation, i.e., which can be used to measure electrical power with acceptable accuracy irrespective of frequency within a wide band of frequencies and which can be used to measure very high frequency power in radio transmission lines, e.g., the power passing between a radio transmitter and an associated serial. In such a case it is very desirable to use the meter with its heater merely interposed in series in the line for if this could be done the need for providing some sort of shunt measuring circuit for the meter—e.g., feeding the meter by tapping off power from the line by some such means as a probe—would be avoided and the apparatus rendered much simpler and easier to insert in a transmission line. However, if the transmission line carries very high frequencies of the order of microwave frequencies—e.g., frequencies up to about 1000 mc./s. or more—great difficulties are experienced in designing a meter of the kind referred to which can be used with the heater merely in series with the line, because, with known meters such insertion causes unacceptably large impedance mismatching and impedance discontinuities with consequent unacceptable large reflections of high frequency energy. The present invention seeks to overcome these defects and to provide improved power meters of the kind referred to which shall be capable of measuring powers up to the order of 1000 watts at any frequency from D.C. up to the order of 1000 mc./s. and which shall be capable of use by inserting the heater directly in series in a line carrying the power to be measured without causing practically unacceptable impedance mismatches and discontinuities.

It has already been proposed, in frequency meters of the kind referred to, to employ a heater in the form of a very thin-walled tubular conductor. See, for example, British Patent No. 554,630.

A conductor used in accordance with the above proposal might be of a resistance alloy such as Nichrome, though other materials (i.e., platinum of graphite) can be used. The power to be measured is passed through the thin-walled tubular conductor and a thermal converter (such as a thermo-couple whose output, amplified if necessary, is taken to a calibrated voltmeter) which could be insulated from but close to said thermal conductor. The tubular conductor is arranged to constitute the inner conductor of a length of co-axial transmission line adapted to be inserted in series in a transmission line carrying the power which is to be measured. If the length of line of which the very thin-walled tubular conductor forms the inner conductor is dimensioned, in accordance with known principles, to have a characteristic impedance closely matching that of the transmission line in which it is to be inserted, there should be, theoretically, no impedance mismatch but in practice, however, current leads must be provided for the thermal converter and, when high frequencies are in question, these leads produce unacceptable impedance discontinuities because of distortion of the field in the said length of line. The leads have to pass out of the line length through the outer conductor which must be provided with holes through which they pass. They must be absolutely radial with respect to the said line length and must be of minimum thickness (theoretically zero thickness) if they are not to produce serious field distortion. In practice, however, they have to be much thicker than is necessary for the obtaining of acceptable low field distortion, they are most difficult to arrange and maintain radial (and any departure from the strict radial will result in serious field distortion) and the holes in the outer conductor (through which they pass) must be of finite, but otherwise undesirably large size. For these reasons the known proposal with a co-axial line as described will not operate satisfactorily up to very high frequencies and the present invention provides an improved power meter of the kind referred to which will do so.

According to this invention a power meter adapted to measure power at any frequency up to a frequency of the order of 1000 mc./s. comprises a heater in the form of a very thin-walled tubular conductor through which the power to be measured is passed and which is arranged to constitute one conductor of a length of so-called "slab" or "strip" transmission line said tubular conductor being insulated from but close to a thermal converter which is heated thereby and has external connection leads which are brought out of the said length of transmission line in the median plane thereof whereby said connection leads produce minimum disturbance of the field within the said length of line which is dimensioned to present a characteristic impedance of predetermined value. It will be seen that, because the leads are in the median plane they can be of practical thickness without causing inacceptable field distortion, they can readily be arranged to lie and be maintained with their axes in that plane, small departures of their positions from the theoretically required one (with axes in the median plane) will not result in serious field distortion and no specially provided holes in other conductors are necessary for them to be brought out of the length of transmission line.

The expression "tubular conductor" is here employed in a wide sense to include not only a simple complete tube of the same cross section at all points in its length but also a complete tube which is tapered over its length or part thereof or what may be termed a "skeleton" tube, i.e. a tube, whether tapered or not, which is longitudinally slotted over part of its length.

The words "very thin-walled" as employed herein mean of a thickness not exceeding a few microns. In normal practice, for power meters for handling frequencies up to the order of 1000 mc./s., the wall thickness of the tubular conductor will be a fraction of a micron e.g. of the order of one-tenth of a micron. Of course, with a very thin-walled tubular conductor as the heater, the effective conductive cross section is almost the same at all frequencies over a very wide range, and frequency-dependent heating variation due to skin effect is almost non-existent.

As previously stated the very thin-walled tubular conductor may be of any suitable known material suitable examples being gold, or a resistance alloy, or graphite. Preferably this conductor is in the known form of a deposits on an insulating carrier core which may be, for example, a glass rod or a glass or other insulating tube or skeleton form carrier to minimize undesired thermal inertia effects.

Figure 2:
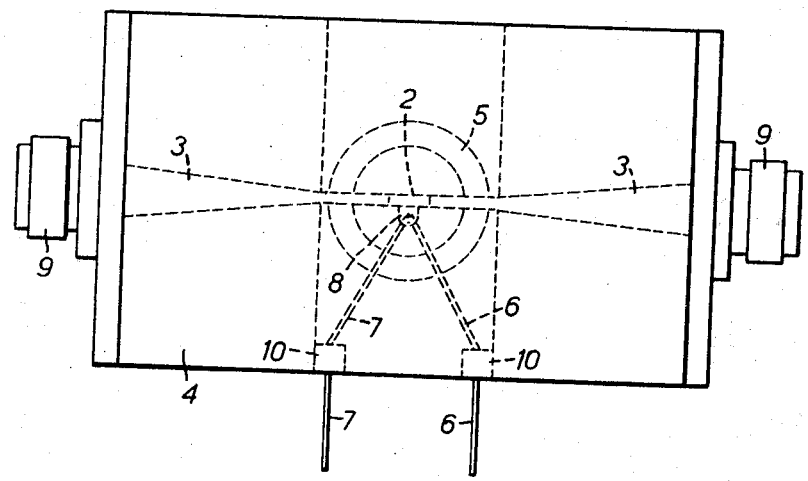

The invention is illustrated in the drawings accompanying the provisional specification in which, FIGURES 1 and 2 are mutually perpendicular schematic cross sectional views of one embodiment of the invention.

Referring to FIGURES 1 and 2, the construction therein shown is a length of slab line which is, in the example illustrated, tapered outwardly of a central section in order to provide a reflectionless transition to give impedance matching at both ends with a co-axial line (not shown) in which the slab line is to be inserted, connectors for connecting to the co-axial line being shown at 9. A heater 2 is situated in the central section of the slab line and is constituted by a deposit of gold about $1/\mu$ thick upon a carrier support constituted by a glass or other rod or tube 1 which is tapered at both ends as shown. A convenient way of making connection to the gold deposit is by making the latter of a length extending beyond the length shown in FIGURE 1 and depositing on top of the extensions thereof a thicker silver deposit 3 indicated by differently inclined shading and which extends over the full lengths of the carrier support on either side of the gold heater 2.

The carrier support 1 with its deposits thereon constitutes the inner conductor of the length of slab or strip line which has opposed slab or strip outer conductors 4 between which the inner conductor is supported by means of glass or similar support rings 5.

Closely adjacent the heater deposit 2 is a thermal converter, such as a thermo-couple or a thermistor, the leads to which are indicated at 6 and 7 and which is just out of contact with the gold deposit 2 and held close thereto by means of a suitable "blob" of adhesive 8 of, for example, glass, or the material known as Araldite. The thermal converter does not itself appear in FIGURES 1 and 2 because it is within the "blob" 8. The leads 6 and 7 are arranged to lie, as accurately as possible, with their axes in the median plane of the slab line and are brought out of the line in that plane. They will, therefore, produce minimum disturbance, approaching zero, of the electromagnetic field of the line and, when the device is inserted in a co-axial transmission line, it will produce minimum impedance discontinuities even at frequencies as high as 1000 mc./s. The value of the surge impedance of the slab or strip line of the device shown in FIGURES 1 and 2 is, of course, determined, in accordance with known design principles, to match that of an ordinary high frequency transmission line e.g. a surge impedance of 50 ohms is readily obtainable by dimensioning in accordance with known principles. If this be done the length of slab or strip transmission line illustrated can be inserted without difficulty in the run of a transmission line the power of which is to be measured.

The construction illustrated has the incidental advantages that it is easy, mechanically, to mount and make connection to the thermal converter, since the leads 6 and 7 have merely to come out through the separating space between the slabs as indicated. In FIGURE 2 the blocks 10 represent low pass filters for eliminating undesired very high frequency pick-up.

I claim:
1. A power metering device adapted to meter power of any frequency up to a fraquency of at least 1000 mc./s. comprising a heater in the form of a very thin-walled tubular conductor through which the power to be measured is passed and which is arranged to constitute the central conductor of a length of "slab" or "strip" transmission line, said tubular conductor extending longitudinally within said transmission line, said tubular conductor being insulated from but close to a thermal converter which is heated thereby and has external metering connection leads which are brought out of the said length of transmission line in the median plane thereof whereby said connection leads produce minimum disturbance of the field within the said length of line which is dimensioned to present a characteristic impedance of predetermined value.

2. A metering device as claimed in claim 1 wherein the very thin-walled tubular conductor is in the form of a deposit on an insulating carrier core.

3. A metering device as claimed in claim 2 wherein the insulating carrier core is an insulating rod.

4. A metering device as claimed in claim 2 wherein the insulating carrier core is an insulating tube.

5. A metering device as claimed in claim 2 wherein the insulating carrier core is of skeleton form.

6. In a power metering device adapted to meter power at any one of a wide range of frequencies, the combination comprising a length of slab or strip transmission line having spaced apart outer conductor means, central conductor means disposed between said outer conductor means, resistance heater means forming a part of said central conductor means, thermal conversion means disposed in heat transfer relationship with said heater means and responsive to heat therefrom, and connection means connected to said thermal conversion means including metering leads extending from said conversion means, between said outer conductor means to the exterior of said transmission line, said leads being positioned in a plane medially located between said outer conductor means to substantially reduce electro-magnetic field disturbances in said transmission line due to the presence of said leads therein.

7. Apparatus in accordance with claim 6 wherein said transmission line includes co-axial connector means disposed at each end thereof for series connection into a further co-axial transmission line, and means connecting said heater means with said co-axial connector means for providing impedance matching at each end of said metering device, said heater means comprising a thin-walled tubular resistance extending longitudinally within said transmission line.

References Cited
UNITED STATES PATENTS

| | | | |
|---|---|---|---|
| 2,443,637 | 6/1948 | Ovrebo | 324—106 |
| 2,859,406 | 11/1958 | Jaffe | 324—95 |

OTHER REFERENCES

Altschuler et al.: I.R.E. Transactions on Microwave Theory and Techniques, May 1960, pp. 328 and 329.

Cohn: I.R.E. Transactions on Microwave Theory and Techniques, March 1955, pp. 119, 123, 124, 126.

RUDOLPH V. ROLINEC, *Primary Examiner.*

ERNEST F. KARLSEN, *Assistant Examiner.*

U.S. Cl. X.R.

324—95